United States Patent Office 2,770,877
Patented Nov. 20, 1956

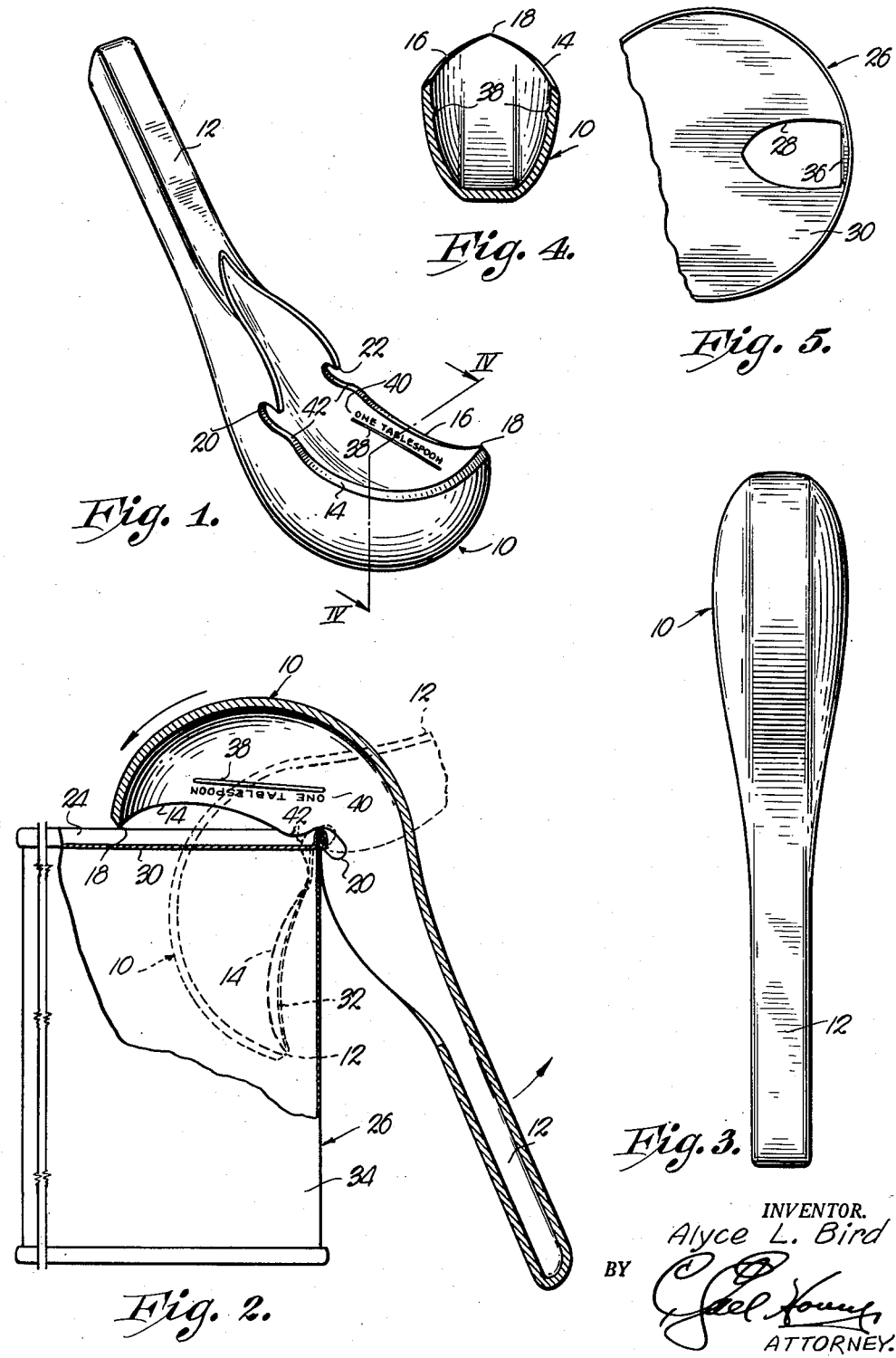

2,770,877

COMBINATION CAN OPENER AND MEASURING CUP

Alyce L. Bird, Mission, Kans.

Application September 15, 1955, Serial No. 534,565

2 Claims. (Cl. 30—123)

This invention relates to the culinary art and more particularly, to an improved hand tool for opening cans and the like, the primary object being to improve upon the nature of the opening formed in the can through use of the tool so that the contents of the can may be readily removed therefrom.

It is the most important object of the present invention to provide an opener particularly adapted for use in opening coffee cans, eliminating the conventional keystrip means now commonly employed, and presenting an opening in the can through which the coffee may be poured into a suitable canister.

Another important object of the present invention is to provide a tool capable of accomplishing the aforementioned results and adapted further for use as a measuring cup to the end that the same may be used to dispense the coffee from the canister in predetermined measured amounts.

Still another object of the instant invention is to provide a measuring cup with can-opening features by the utilization of cutting edges on a hollow bowl portion thereof which terminate in a sharp can-piercing point at one end of the bowl.

A further object of this invention is the provision of a combination can opener and measuring cup wherein the aforementioned cutting edges of the bowl are provided with hooks engageable with the rim of the can and adapted to serve as a fulcrum around which the can-piercing point swings.

A still further object of the instant invention is to provide a device of the aforementioned character that has a handle integral with the bowl at one end thereof in opposed relationship to the piercing point and adjacent the hook means formed in the edges of the bow.

In the drawing:

Figure 1 is a perspective view of a combination can opener and measuring cup made pursuant to my present invention.

Fig. 2 is an enlarged, longitudinal, cross-sectional view of the device shown in Fig. 1, illustrating the manner of use thereof in connection with a can to be opened.

Fig. 3 is an enlarged plan view of the device.

Fig. 4 is a cross-sectional view taken on line IV—IV of Fig. 1; and

Fig. 5 is a fragmentary, plan view of the can shown in Fig. 2 illustrating the opening formed therein through use of the device shown in Fig. 1.

As clearly illustrated in the drawing, the combination can opener and measuring cup forming the subject matter of the instant invention, includes as its component parts, a hollow bowl broadly designated by the numeral 10, a handle 12 at one end of the bowl 10 and preferably integral therewith, a pair of transversely beveled, longitudinally concave cutting edges 14 and 16 that converge toward the opposite end of the bowl into a can-piercing point 18, and a pair of hooks 20 and 22 formed in the edges 14 and 16 respectively adjacent the handle 12, and adapted to engage rim 24 of can 26 in the manner illustrated in Fig. 2 of the drawing.

It is clear that as the device is moved in the direction of the arrows in Fig. 2, hooks 20 and 22 serve as a fulcrum around which the can-piercing point 18 swings, thereby cutting a hole 28 in one end 30 of the can 26 having the configuration illustrated in Fig. 5 of the drawing. Tab 32 (Fig. 2) that is struck from the end 30 presenting the opening 28, is swung downwardly and inwardly toward side wall 34 of can 26 along line of bend 36.

It is seen that when the device is employed in connection with the opening of coffee cans for example, the conventional keystrip provided thereon need not be used and the opening 28 presents a more convenient means of pouring the contents of the cans 26 into a canister as is the common practice by most housewives. Subsequently, the semi-ovoidal bowl 10 may be used to dispense a predetermined quantity of the coffee from the canister and by way of convenience, opposed ribs 38 may be provided within the bowl 10 to indicate, for example, a single tablespoon level as seen by indicia 40.

The concave configurations of the edges 14 and 16 provide a progressive cutting action in the end 30 of can 26 following the initial piercing thereof by the point 18. It is to be noted that the cutting edges 14 and 16 terminate adjacent the hooks 20 and 22 in raised portions 42 that serve to move the tab 32 to the position shown by dotted lines in Fig. 2 along the line of bend 36. The edges 14 and 16 may continue from the hooks 20 and 22 into the handle 12, but such continuations are preferably unsharpened, and in the interest of lightness and convenience of manufacture, the handle 12 may be hollow as illustrated.

Having thus described the invention what is claimed as new and desired to be secured by Letters Patent is:

1. A combination can opener and measuring cup comprising a hollow, substantially semi-ovoidal bowl provided with a handle at one end thereof and a pair of concave cutting edges converging toward the opposite end of the bowl and terminating in a can-piercing point.

2. A combination can opener and measuring cup comprising a hollow, substantially semi-ovoidal bowl provided with a handle at one end thereof and a pair of concave cutting edges converging toward the opposite end of the bowl and terminating in a can-piercing point, each of said edges being provided with a hook adjacent the handle engageable with the rim of the can and adapted to serve as a fulcrum around which the can-piercing point swings.

References Cited in the file of this patent

UNITED STATES PATENTS

D. 160,695    De Fee _____ Oct. 31, 1950